US012591649B2

(12) United States Patent
Tuukkanen et al.

(10) Patent No.: US 12,591,649 B2
(45) Date of Patent: Mar. 31, 2026

(54) SYSTEM AND METHOD FOR AGE BASED PROCESSING OF USER DATA

(71) Applicant: HERE Global B.V., Eindhoven (NL)

(72) Inventors: Marko Tapio Tuukkanen, Berlin (DE);
Jerome Beaurepaire, Courbevoie (FR)

(73) Assignee: HERE Global B.V., Eindhoven (NL)

( * ) Notice: Subject to any disclaimer, the term of this patent is extended or adjusted under 35 U.S.C. 154(b) by 165 days.

(21) Appl. No.: 18/371,907

(22) Filed: Sep. 22, 2023

(65) Prior Publication Data

US 2025/0103692 A1      Mar. 27, 2025

(51) Int. Cl.
| | |
|---|---|
| *H04W 4/029* | (2018.01) |
| *G06F 21/32* | (2013.01) |
| *H04L 9/40* | (2022.01) |
| *H04W 4/021* | (2018.01) |

(52) U.S. Cl.
CPC ............ *G06F 21/32* (2013.01); *H04L 63/102* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 9,405,967 | B2 | 8/2016 | Samet |
| 9,870,679 | B2 | 1/2018 | Kleihorst et al. |

| | | | |
|---|---|---|---|
| 11,468,196 | B2 | 10/2022 | Jones et al. |
| 2017/0024386 | A1 | 1/2017 | Maskatia et al. |
| 2022/0237631 | A1 | 7/2022 | Mehta et al. |
| 2024/0055089 | A1* | 2/2024 | Nakashima ............ G06V 40/25 |

OTHER PUBLICATIONS

Ho et al., "The development and validation of a prototype mobility tracker for assessing the life space mobility and activity participation of older adults", Research Article, BMC Geriatrics, 2020, 12 pages.

* cited by examiner

*Primary Examiner* — John F Mortell
(74) *Attorney, Agent, or Firm* — DITTHAVONG. STEINER, & MLOTKOWSKI

(57) ABSTRACT

An approach is provided for processing user data. The approach, for example, involves monitoring mobility pattern data of a user for a predetermined time period. The monitoring of the mobility pattern data for the predetermined time period is consented by the user registered on a platform. The approach further involves determining age data of the user based on the monitored mobility pattern data. The approach further involves providing a label to user data associated with the user based on the determined age data. The label comprises one of a legal age user or an underage user. The processing of the labeled user data comprises storing the labeled user data in a user data database when the provided label corresponds to the legal age user, and performing one or more actions on the labeled user data when the provided label corresponds to the underage user.

20 Claims, 10 Drawing Sheets

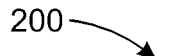
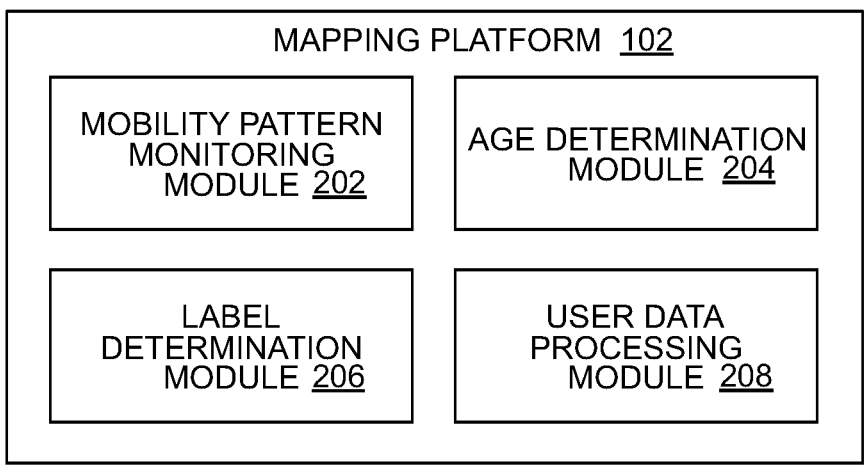
MAPPING PLATFORM  102
MOBILITY PATTERN MONITORING MODULE 202
AGE DETERMINATION MODULE 204
LABEL DETERMINATION MODULE 206
USER DATA PROCESSING MODULE 208
FIG. 2

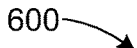

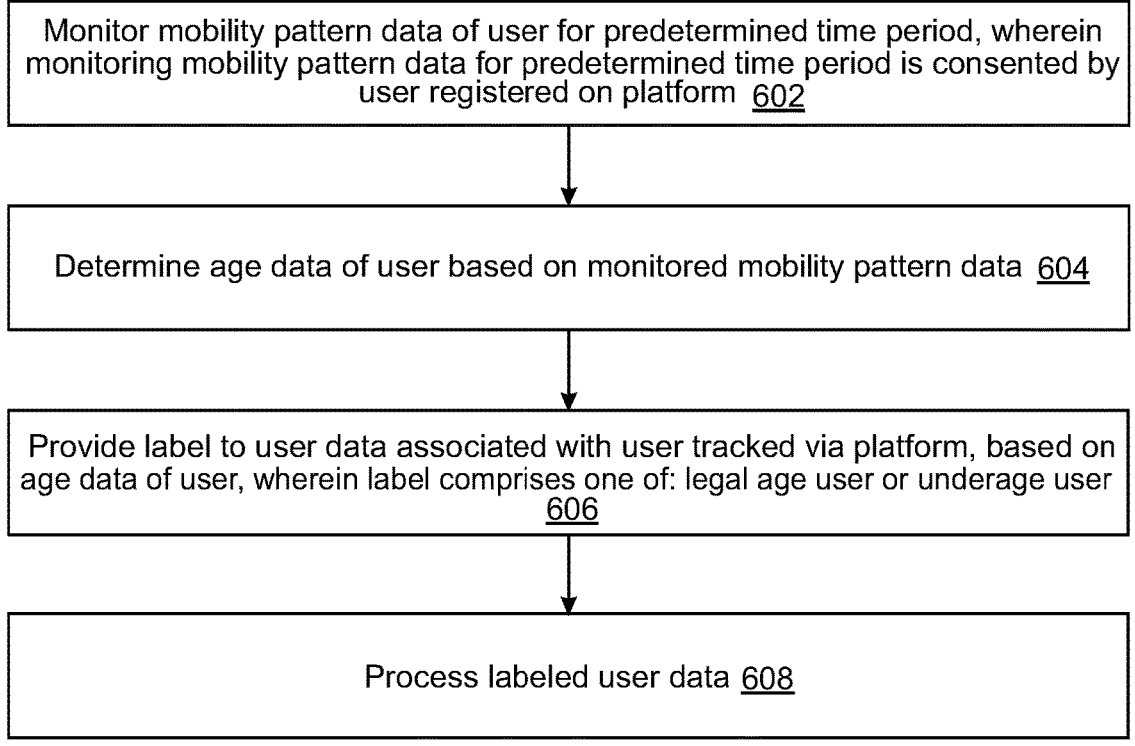

600

| Monitor mobility pattern data of user for predetermined time period, wherein monitoring mobility pattern data for predetermined time period is consented by user registered on platform  602 |

| Determine age data of user based on monitored mobility pattern data  604 |

| Provide label to user data associated with user tracked via platform, based on age data of user, wherein label comprises one of: legal age user or underage user  606 |

| Process labeled user data  608 |

FIG. 6

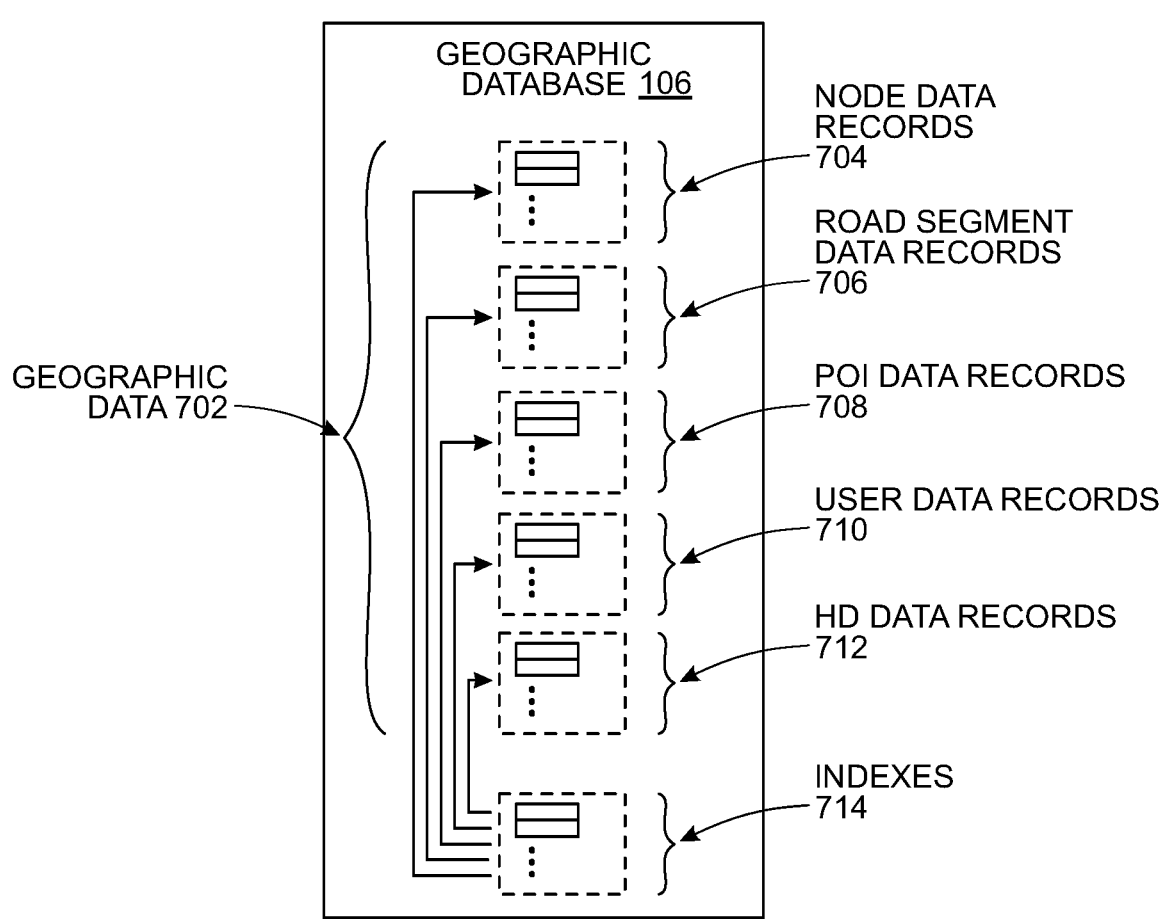
FIG. 7

800

900

SYSTEM AND METHOD FOR AGE BASED PROCESSING OF USER DATA

BACKGROUND

Privacy laws and regulations, such as the California Consumer Privacy Act (CCPA), the European Data Protection Directive (Directive 95/46/EC), or the like, require platforms providing services or products to acquire consent of a user utilizing the platforms to collect user data. For example, the platforms may be associated with navigation services, social media services, advertising services and the like. Moreover, certain platforms may be for example, educational platforms or gaming platforms that may be utilized by users that are underage (i.e., children). In such cases, the consent may be required from a legal age user (such as a parent or a guardian of the underage user) to collect the user data.

Often, some underage users may present themselves as the legal age users to provide the consent and to utilize the various platforms in an improper manner. Generally, it may be difficult for the platforms to identify the underage users and get the necessary consent from the legal age user to collect the user data, for example, location data. Moreover, many platforms may provide free of cost services that may enable usage of the services without obtaining bank related information of the users, such as credit card details. In such cases, reliable identification of the age of the users may become more difficult. Additionally, the platforms may themselves be uninterested in collecting the user data related to the underage users without the consent of the legal age users. Besides unwanted legal exposure, collecting user data related to underage users may also negatively impact machine learning and other data analysis processes taking place in the platforms, since such processes may be tailored to incoming data associated to adult users. Such measures may enable protection of rights and personal data of the users and may enable prevention of illegitimate use of the services as well.

Therefore, there is a need for a system and a method to reliably determine the underage users utilizing the platforms.

SOME EXAMPLE EMBODIMENTS

According to one embodiment, a system for age based processing of user data is provided. The system comprises at least one processor, and at least one memory including computer program code for one or more computer programs, the at least one memory and the computer program code configured to, with the at least one processor, cause, at least in part, the system to monitor mobility pattern data of a user for a predetermined time period. The monitoring of the mobility pattern data for the predetermined time period is consented by the user registered on a platform. The system is also caused to determine age data of the user based on the monitored mobility pattern data. The system is also caused to determine a label for the user data associated with the user based on the determined age data of the user. The label comprises one of a legal age user or an underage user. The system is also caused to process the labeled user data. The processing may include storing the labeled user data in a user data database when the determined label corresponds to the legal age user; and performing one or more actions on the labeled user data when the determined label corresponds to the underage user.

According to another embodiment, a method for processing user data based on age is provided. The method comprises monitoring mobility pattern data of a user for a predetermined time period. The monitoring of the mobility pattern data for the predetermined time period is consented by the user registered on a platform. The method further comprises determining age data of the user based on the monitored mobility pattern data. The method further comprises determining a label to user data associated with the user based on the determined age data of the user. The label comprises one of a legal age user or an underage user. The method further comprises processing the labeled user data. The processing may include storing the labeled user data in a user data database when the determined label corresponds to the legal age user; and performing one or more actions on the labeled user data when the determined label corresponds to the underage user.

According to another embodiment, a non-transitory computer-readable storage medium carries one or more sequences of one or more instructions which, when executed by one or more processors, cause, at least in part, an apparatus to perform operations. The operations comprise monitoring mobility pattern data of a user for a predetermined time period. The monitoring of the mobility pattern data for the predetermined time period is consented by the user registered on a platform. The operations further comprise determining age data of the user based on the monitored mobility pattern data. The operations further comprise determining a label to user data associated with the user based on the determined age data of the user. The label comprises one of a legal age user or an underage user. The operations further comprise processing the labeled user data. The processing may include storing the labeled user data in a user data database when the determined label corresponds to the legal age user; and performing one or more actions on the labeled user data when the determined label corresponds to the underage user.

In addition, for various example embodiments described herein, the following is applicable: a computer program product may be provided. For example, a computer program product comprising instructions which, when executed by a computer, cause the computer to perform any one or any combination of methods, operations, or processes disclosed herein.

According to another embodiment, an apparatus comprises means for monitoring mobility pattern data of a user for a predetermined time period. The monitoring of the mobility pattern data for the predetermined time period is consented by the user registered on a platform. The apparatus further comprises determining age data of the user based on the monitored mobility pattern data. The apparatus further comprises determining a label to user data associated with the user based on the determined age data of the user. The label comprises one of a legal age user or an underage user. The apparatus further comprises processing the labeled user data. The processing may include storing the labeled user data in a user data database when the determined label corresponds to the legal age user; and performing one or more actions on the labeled user data when the determined label corresponds to the underage user.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for conducting the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of components of the system capable of age based processing of the user data, according to one embodiment;

FIG. 6 is a flowchart of a method for age based processing of the user data, according to one embodiment;

FIG. 7 is a diagram of a geographic database, according to one embodiment;

DESCRIPTION OF SOME EMBODIMENTS

Examples of a system, method, and computer program for processing user data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
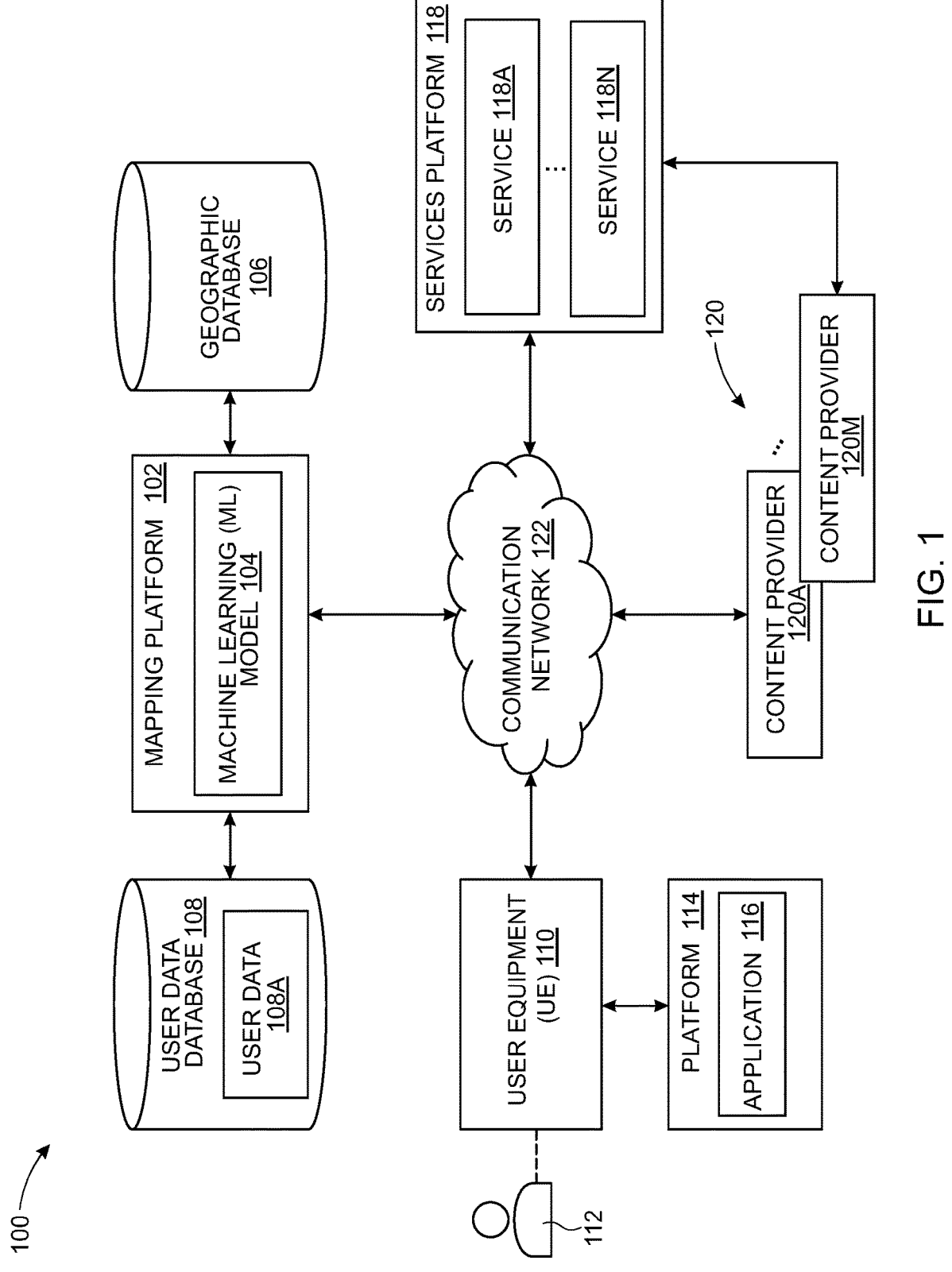
FIG. 1 is a diagram of a system capable of age based processing of user data, according to one embodiment.

FIG. 1 is a diagram of a system 100 capable of processing user data based on age, according to one embodiment. The system 100 may include a mapping platform 102. The mapping platform 102 may include a machine learning model 104. The system 100 may further include a user data database 108 that includes user data 108A. The system 100 may further include a user equipment (UE) 110, a user 112, a platform 114, an application 116, services platform 118 and content providers 120. The services platform 118 may include, for example, a service 118A and a service 118N. The content provider 120 may include, for example, a content provider 120A and a content provider 120M. The system 100 may further include a communication network 122. The content provider 120 or the services platform 118 may provide similar data and/or functionality to a user data database, such as the user data database 108.

Generally, various platforms may be utilized by users for different services. Certain platforms may provide the services or products to only legal age users. For example, usage of navigational services providing digital maps may require registration of the legal age user (such as an adult). However, some underage users may present themselves as the legal age users to provide consent and to utilize the platform in an improper manner.

Moreover, collection of user data of the user via the platforms may require consent of the legal age user. For example, location data of the user may be collected. Also, the platforms may themselves be uninterested in collecting the user data, such as the location data related to the underage users without the consent of the legal age users, for safety and protection of rights of the underage users. Thus, when the underage users pose as the legal age users, the collection of the user data may unnecessarily be done by the platforms which may be against the protection of rights of the underage users.

On the other hand, the system 100 of the present disclosure enables processing of the user data 108A based on age of the user 112. The system 100 may be configured to reliably identify underage users and the legal age users that are using the platform 114. The system 100 may utilize mobility pattern data of the user 112 to determine age data of the user 112. For example, the mobility pattern data may be collected via the UE 110 associated with the user 112. The UE 110 may be in control of the user 112 or may be co-located with the user 112. Typically, the mobility pattern of the underage users and the legal age users may differ. For example, the mobility pattern of underage users such as a child may include locations suitable for the underage users. Similarly, the mobility pattern of the legal age users such as adults may include locations that are suitable for the legal age users. Thus, the mobility pattern data may be utilized to accurately detect the age data of the user 112. Based on the age data, the system 100 may determine a label for the user data 108A of the user 112 that may be tracked via the platform 114. Only when the user 112 is identified as the legal age user, the user data 108A may be stored in the user data database 108. In case the user 112 is identified as the underage user, the system 100 may stop further tracking of the user data 108A and may perform one or more actions on the already collected user data 108A, that may prevent unnecessary collection of the data of the underage users. Moreover, in case the user 112 is identified as the underage user, a consent may be received from, for example, a parent or a guardian of the user 112, to process the already collected user data 108A. The user data 108A in such a case may be deleted, encrypted or the usage of the user data 108A may be limited, based on the consent. Thus, the system 100 may enable protection of personal data and rights of the underage users by reliably and accurately identifying the age data of the users utilizing the platform 114.

In operation, the user 112 may register on the platform 114 via the UE 110. For example, the platform 114 may be associated with the application 116, such as a navigational service that would require tracking the user data 108A. Once the user 112 has registered, in order for the system 100 to accurately identify that the user 112 is the legal age user and not some underage user posing as the legal age user, the system 100 may utilize the mobility pattern data. The system 100 may monitor the mobility pattern data for a predetermined time period, based on the consent of the user 112. Details of monitoring the mobility pattern data are further provided, for example, in FIG. 3, FIG. 4A and FIG. 4B.

Based on the mobility pattern data, the system 100 may determine the age data of the user 112. In some embodiments, the system 100 may train the ML model 104 to determine the age data of the user 112 based on the mobility pattern data. Details of training the ML model 104 are further provided, for example, in FIG. 5.

The system 100 may further determine a label for the user data 108A, such that the label is one of the legal age user or the underage user. Once it is determined that the user 112 is actually the legal age user, the user data 108A may be processed and further be tracked via the platform 114. The user data 108A along with the label "legal age user" in case of the legal age user may be stored in the user data database 108. In case the system 100 determines that the user 112 is the underage user (such as a child) based on the label, the system 100 performs one or more actions on the user data 108A. For example, the system 110 may ask for the consent from the legal age user (such as the parent or any guardian) associated with the user 112, to process the user data 108A. In some embodiments, once consent is received, the user data 108A may be encrypted, stored after encryption, or a set of data from the labeled user data 108A may be stored along with the label "underage user" in the user data database 108. Details of determining the label and processing the user data 108A are further provided, for example, in FIG. 3.

The components of the mapping platform 102 for age based processing of the user data 108A are described in FIG. 2.

FIG. 2 is a diagram 200 of components of the system 100 capable of age based processing of the user data 108A, according to one embodiment. In one embodiment, as shown in FIG. 2, the mapping platform 102 of the system 100 includes one or more components capable of age based processing of the user data 108A according to the various embodiments described herein. It is contemplated that the functions of the components of the mapping platform 102 may be combined or performed by other components of equivalent functionality. As shown, in one embodiment, the mapping platform 102 includes a mobility pattern monitoring module 202, an age determination module 204, a label determination module 206 and a user data processing module 208. The above presented modules and components of the mapping platform 102 can be implemented in hardware, firmware, software, or a combination thereof. Though depicted as a separate entity in FIG. 1, it is contemplated that the mapping platform 102 may be implemented as a module of any of the components of the system 100 (e.g., a component of the services platform 118, the content providers 120, the UE 110, the application 116, and/or the like). In another embodiment, one or more of the modules 202-208 may be implemented as a cloud-based service, local service, native application, or combination thereof. The functions of the mapping platform 102 and modules 202-208 are discussed with respect to the figures below.

Figure 3:
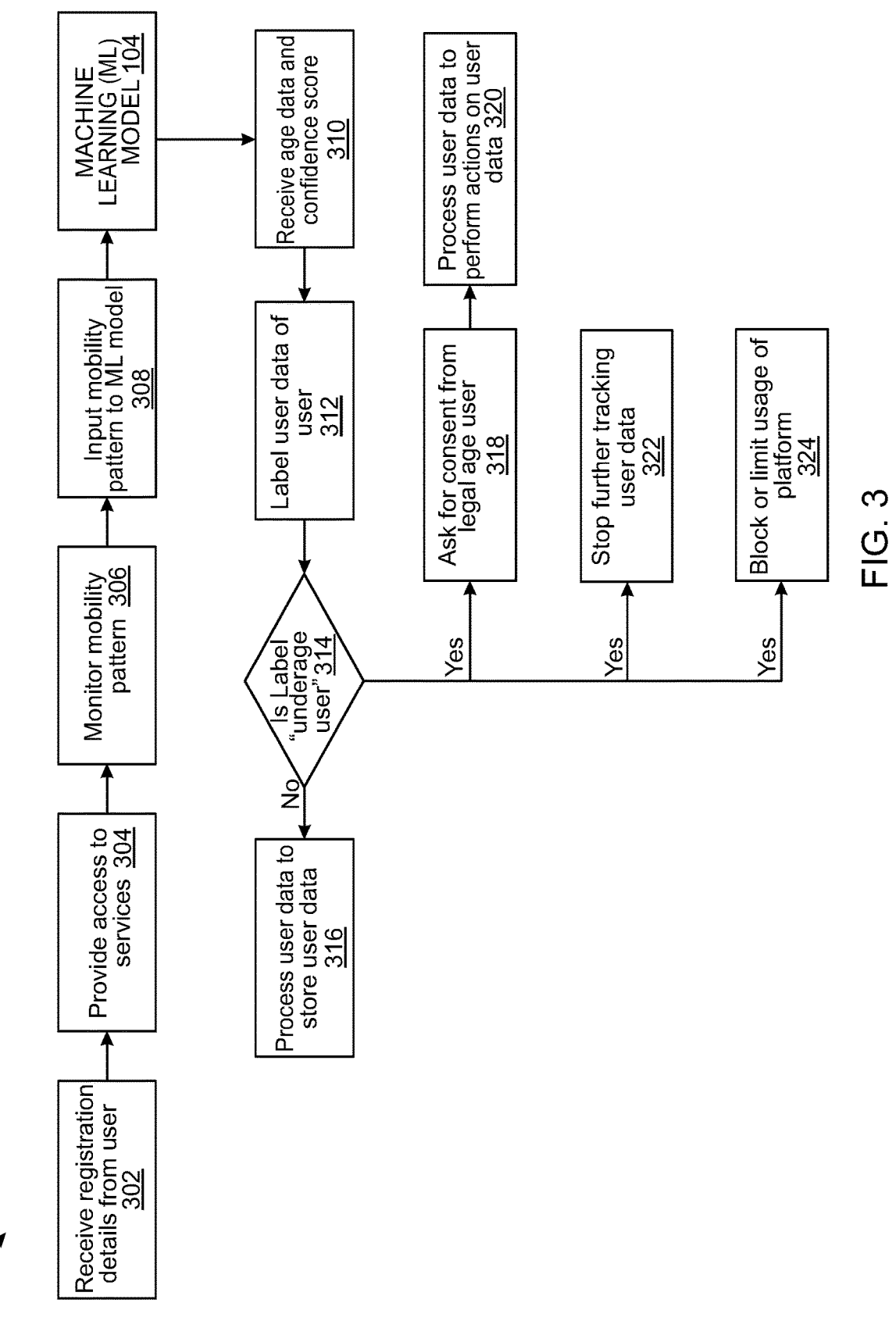
FIG. 3 is a diagram depicting steps for processing the user data, according to one embodiment.
Figure 8:
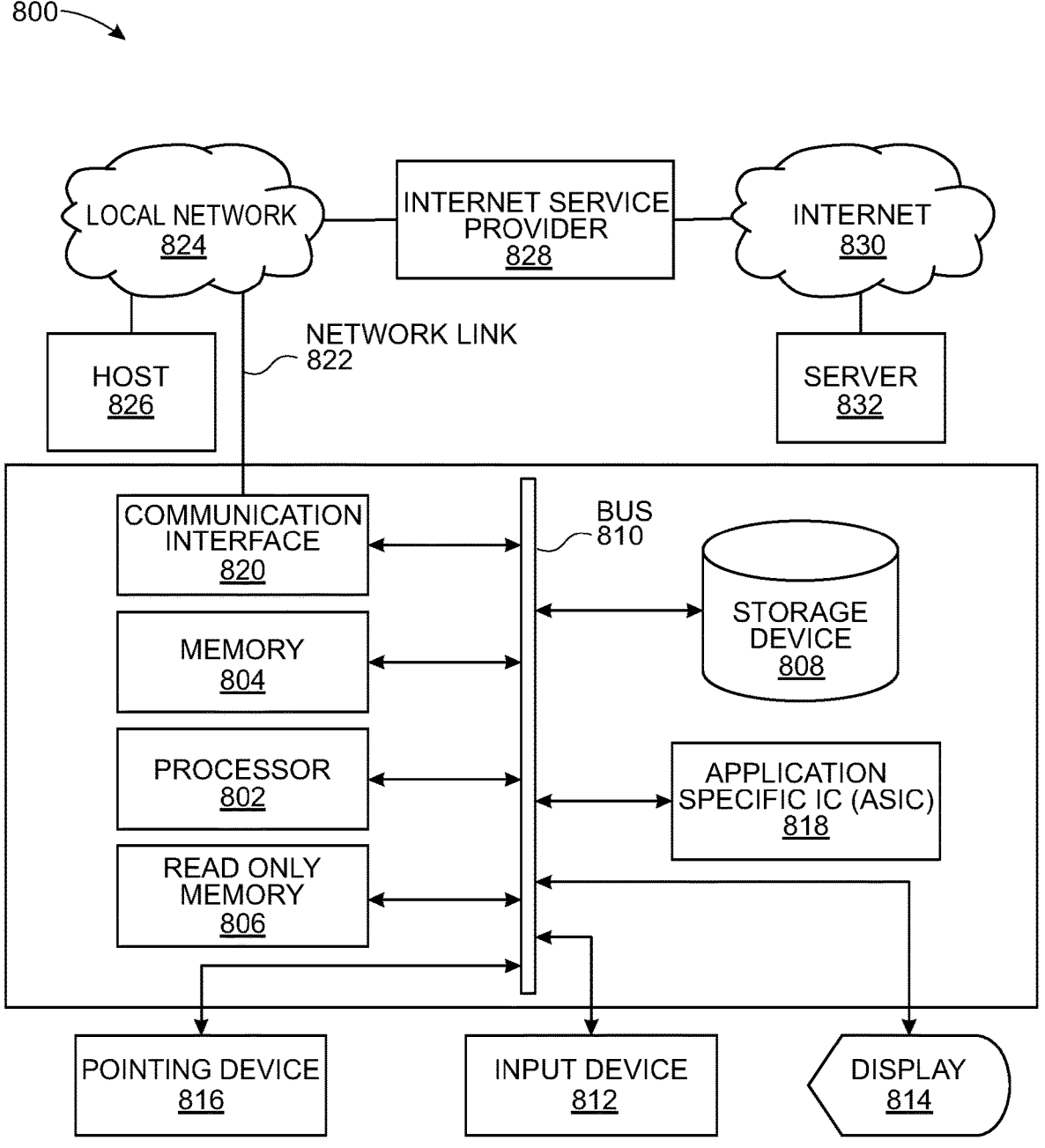
FIG. 8 is a diagram of hardware that can be used to implement an embodiment.
Figure 9:
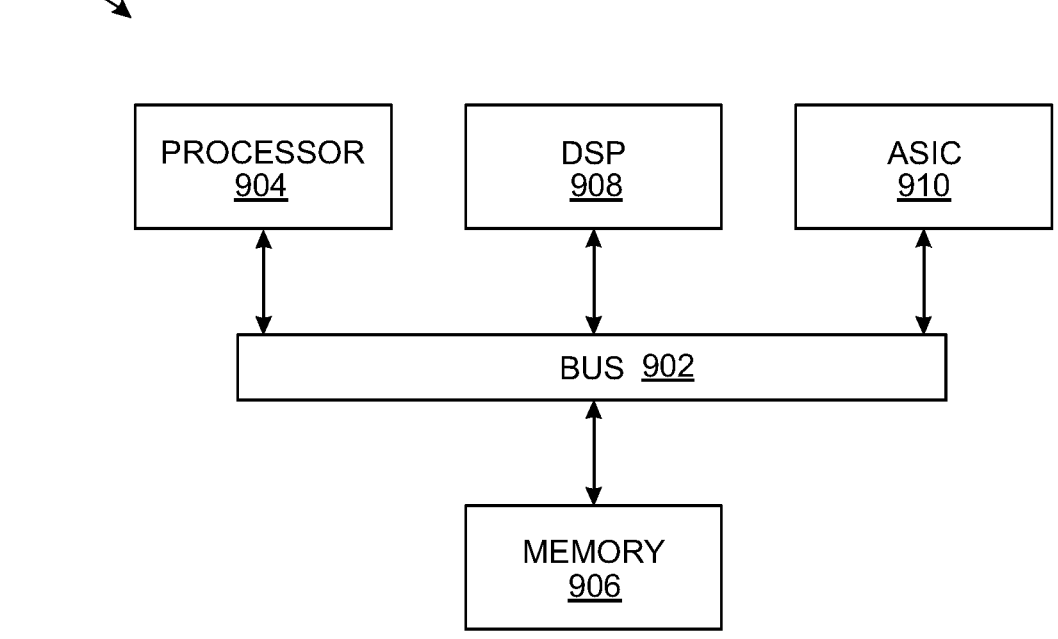
FIG. 9 is a diagram of a chip set that can be used to implement an embodiment.

FIG. 3 is a diagram 300 depicting steps for processing the user data 108A, according to one embodiment. In various embodiments, the mapping platform 102 and/or any of the modules 202-208 may perform one or more of the steps depicted in the diagram 300 and may be implemented in, for instance, a chip set including a processor and a memory as shown in FIG. 8 and FIG. 9. As such, the mapping platform 102 and/or any of the modules 202-208 may provide means for accomplishing various parts of the steps depicted in the diagram 300, as well as means for accomplishing embodiments of other processes described herein in conjunction with other components of the system 100. Although the diagram 300 is illustrated and described as a sequence of steps, it is contemplated that various embodiments of the method explained in the diagram 300 may be performed in any order or combination and need not include all of the illustrated steps.

At step 302, registration details of the user 112 may be received. The mapping platform 112 may be configured to receive the registration details of the user 112 via the platform 114. The platform 114 may be associated with different services, for example, navigational services, educational services, social media services, advertising services, dating services, employment based services, and the like. In an exemplary scenario, the platform 114 may be associated with the navigational service, such as a map providing service. The application 116 may be provided by the platform 114. The application 116 may be installed on the UE 110 by the user 112 to access the services provided by the platform 114. During the registration, the mapping platform 102 may receive details such as personal information of the user 112, for example, a name of the user 112, a contact number of the user 112, an age of the user 112, an electronic mail address of the user 112 and the like. Moreover, a consent for tracking of the user data 108A may be received from the user 112 as part of the registration. In some embodiments, the user data 108A may include location information of the user 112, search history of the user 112, usage history of the application 118, and so forth.

At step 304, access to the services may be provided. In an embodiment, the mapping platform 102 may be configured to provide access to the services of the platform 114. Once the user 112 is be registered, the application 116 may be utilized by the user 112 to access the services provided by the platform 114, such as the navigational services. In an example, the application 116 may be a digital map application. The services of the digital map application may include, for example, providing the digital maps for different locations for the user 112, providing personalized recommendations for the locations, road traffic information, crowd size/density information, and the like.

At step 306, mobility pattern data may be monitored. In some embodiments, the mobility pattern monitoring module 202 may be configured to monitor the mobility pattern data of the user 112. The mobility pattern data may include information associated with travel of the user 112. For example, the locations visited by the user 112 and a time of visit to the locations. For example, the mobility pattern data may be collected at least in part via the UE 110 associated with the user 112. The mobility pattern data may be monitored for a predetermined time period. In an embodiment, the monitoring of the mobility pattern data for the predetermined time period may be consented by the user 112. In an example, the predetermined time period may be different for different users. For example, the predetermined time period may be a first few days (e.g., 10 days) of using the application 116. In another example, the predetermined time period may correspond to a number of hours of use of the application 116, a number of requests and types of requests made on the application 116, a number of and a type of searches on the application 116, tracked navigational routes followed by the user 112, and so forth. In one or more embodiments, the consent for monitoring the mobility pattern data may be received during the registration process of the application 116.

In some embodiments, the monitored mobility pattern data for the predetermined time period may include information associated with at least one of visited points of interests (POIs) by the user 112, frequency of the visits to the POIs, a timestamp associated with the POIs, a duration of the visits to the POIs, a type of transportation utilized by the user 112 to access the POIs, a frequency of the utilization of the type of transportation, weather conditions at a time of the visits, a type of events associated with the POIs, and a set of users attending the events at the POIs. It may be noted that there may be a distinction between the locations visited by the legal age users (e.g., adults) and the underage users (e.g., children).

For example, the POIs of the legal age users may include offices, grocery stores, nightclubs, fine dining restaurants, gas stations, and so forth. Similarly, the POIs of the underage users may include schools, recreational centers, coaching centers, playgrounds, and the like. The frequency of the visits to the POIs may also depend on the age of the users. For example, the legal age user may visit the office five days a week. Moreover, the underage user may sometime accompany the legal age user to the office, however, the frequency of visit to the office by the underage user may be less, e.g., once a month. The timestamp associated with the POIs may include a time and date of visit to the POIs by the user 112.

For example, during nighttime, the adult may visit a location, such as the grocery store or any other location outside their house. However, the child may stay indoors after a certain hour of the day. In another example, the POI for the underage user may be the playground during a certain time of the day. In yet another example, some POIs may be associated with enforced age verification. Such type of POIs may require age verification, e.g., via an official identification (ID) card check to provide access to the users. Examples of such POIs may include nightclubs, alcohol stores, and the like. Such information may help in identification of the legal age user from the underage user. Furthermore, the duration of the visits to the POIs may also help in the identification of the underage users. For example, in case the user 112 is staying at the school from 09:00 AM in the morning till 02:30 PM on weekdays, the probability of the user 112 being the underage user may be high. It may be noted that teachers and other staff at the school may also stay at the school for the same duration, however, their other mobility patterns such as e.g. visiting gas stations, grocery stores, banks, post offices, etc., may be a differentiating factor to identify the underage users. In another example, in case the user 112 is at the POI that enforces the age verification for more than a certain duration, the probability of the user 112 being the legal user may be high. In some embodiments, a measure of the confidence score associated with the POIs enforcing the age verification may be higher than a measure of the confidence score associated with other POIs, as the time spent in the POIs enforcing the age verification may be better indicators of the user 112 being the legal user.

Moreover, the type of transportation utilized by the user 112 to access the POIs may be, for example, a school bus, an owned vehicle such as a car or a bike, a cycle, a shared cab, a flight and so forth. For example, utilizing the shared cab may require a user to be the legal age user. Thus, in case the type of transportation utilized by the user 112 is the shared cab, the probability of the user 112 being the legal age user may be high. The frequency of utilization of the type of transportation may include a number of times the transportation is being used. For example, in case the user 112 buses the school bus every weekday at specific times, the probability of the user 112 being the underage user may be high. Furthermore, the weather conditions at the time of the visits may help in identifying the legal age users and the underage users. For example, during heatwaves and rainy weather, the underage users may be less likely to be outdoors. The mapping platform 102 may further determine the type of events associated with the POIs. For example, there may be a professional (e.g. medical, finance, insurance, law, etc.) conference at a POI such as a hotel. Thus, visiting the location of the professional conference may indicate that the user 112 may be the legal age user. Also, the mapping platform 102 may determine the set of users attending the events at the POIs. For example, the set of users attending the location of the dental conference may mostly be the legal age users. Such information may increase the probability of the user 112 being the legal age user.

In some embodiments, data associated with an order or a sequence of visiting the POIs may also be monitored by the mapping platform 102. In certain cases, the sequence of visiting a POI may be different for the legal age user and the underage users. For example, the underage users may arrive at a school in the morning, and the legal age user may arrive during afternoon to pick up the underage user from the school. In another embodiment, data associated with movements at the POIs may also be monitored. For example, the underage user may stay inside the school premises during certain hours of the day, however, the legal age user may only be allowed till a certain distance from or around the school premises. Moreover, data associated with entrances to the POIs may be monitored. It may be noted that certain entrances of the POIs may only allow legal age users. For example, there may be different entrances in a stadium for players (such as legal age users) and audience that may also include underage users. Such data may be utilized for the monitoring of the mobility pattern data. An exemplary scenario depicting monitoring of the mobility pattern data is shown in FIG. 4A and FIG. 4B.

Figures 4A, 4B:
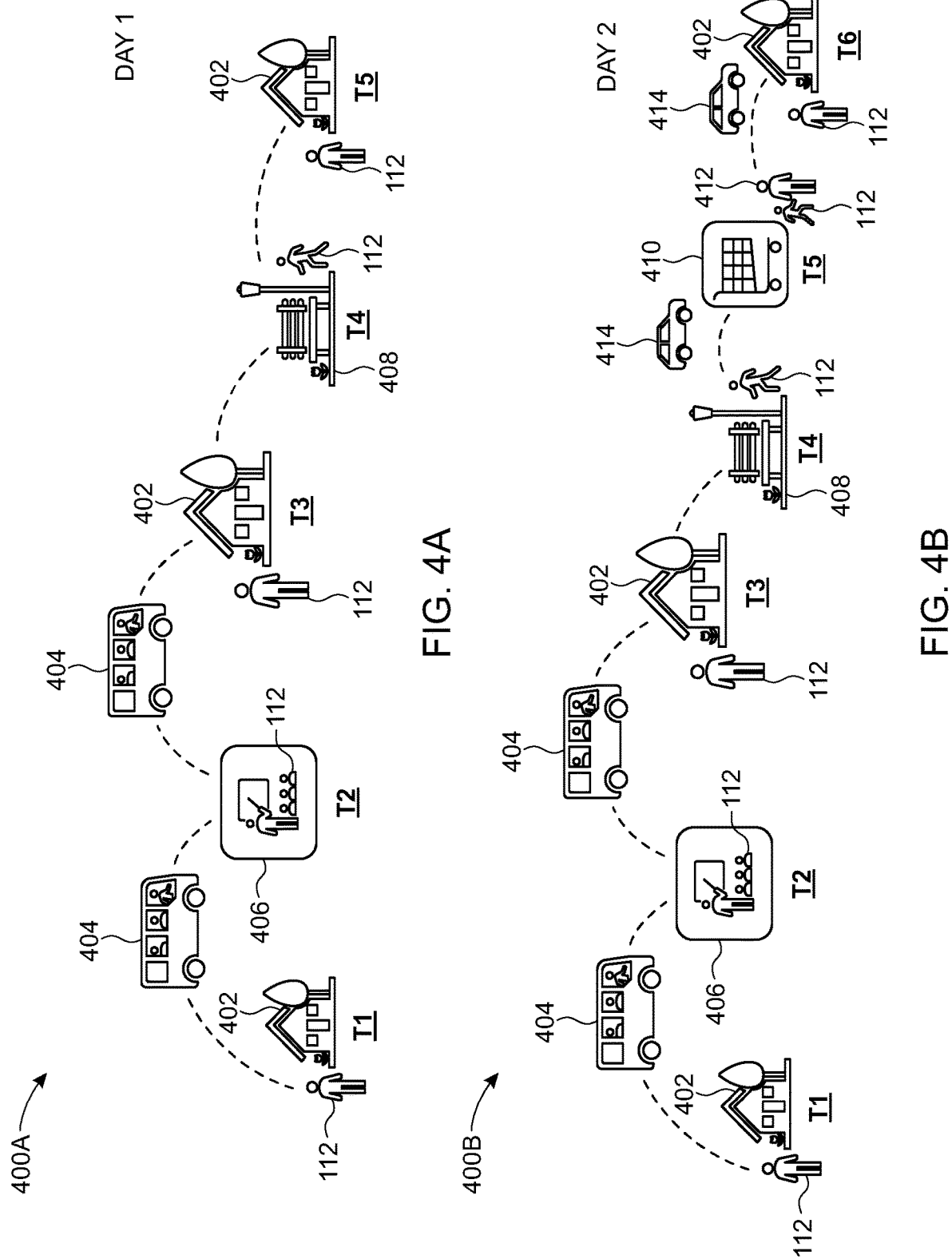
FIGS. 4A and 4B collectively illustrate exemplary scenarios for monitoring of mobility pattern data of the user, according to one embodiment.

FIGS. 4A and 4B collectively illustrate exemplary scenarios for monitoring of mobility pattern data of the user, according to one embodiment. FIG. 4A illustrates a diagram 400A. The diagram 400A includes the exemplary mobility patterns of the user 112 for day "1" of the predefined time period. In an exemplary scenario, the user 112 may be at a first POI, i.e., a home 402 of the user 112 at a time "T1". The user 112 may board a school bus 404 to reach a second POI, i.e., a school 406 at a time "T2". The user 112 may again board the bus and reach the home 402 at a time "T3". Further, at a time "T4", the user 112 may reach a third POI, i.e., a playground 408. The user 112 may again reach the home 402 at a time "T5". The mobility pattern monitoring module 202 may monitor the POIs, such as the school 406 and the playground 408 visited by the user 112 along with the type of transportation used, such as the school bus 404, a duration of stay at each of the POIs, and the timestamp associated with the POIs.

FIG. 4B illustrates a diagram 400B. The diagram 400B includes the exemplary mobility patterns of the user 112 for day "2" of the predefined time period. In an exemplary scenario, the user 112 may be at the first POI, i.e., the home 402 of the user 112 at the time "T1". The user 112 may board the school bus 404 to reach the second POI, i.e., the school 406 at a time "T2". The user 112 may again board the bus and reach the home 402 at the time "T3". Further, at the time "T4", the user 112 may reach the third POI, i.e., the playground 408. At a time "T5", the user 112 may be at a shopping mall 410 along with a user 412. The user 112 may travel in a car 414 to reach the shopping mall 410. For example, the user 412 may be the legal age user (such as the adult). In such a case, the user 412 may drive the car 414 and the user 112 may travel along with the user 412 in the car 414. The user 112 may again reach the home 402 via the car 414 at a time "T6". Thus, the mobility pattern monitoring module 202 may monitor stays/dwells at POIs, such as the school 406, the playground 408 and the shopping mall 410 visited by the user 112 along with the type of transportation used, such as the school bus 404 and the car 414, a duration of stay at each of the POIs, and the timestamp associated with the POIs. Therefore, in such a manner, the mobility pattern data may be monitored for the predefined time period.

Referring again to FIG. 3, at step 308, the monitored mobility pattern data of the user 112 may be provided, as an input, to the ML model 104. The mapping platform 102 may be configured to provide the monitored mobility pattern data to the ML model 104 as the input. In some embodiments, the ML model 104 may be a prediction model or a classification model that may be utilized to determine age data of the user 112. Examples of the ML model 104 includes, but may not be limited to, a naive bayes model, a logistic regression model, a decision tree based model, a K-nearest neighbors model, a support vectors machine (SVM) model. In some embodiments, other types of ML models may also be applied on the mobility pattern data. Once the mobility pattern data is generated, the mobility pattern data may be provided to the ML model 104 as the input.

At step 310, the age data of the user 112 may be determined based on the monitoring of the mobility pattern data. In some embodiments, the age determination module 204 may be configured to determine the age data of the user 112 based on the monitoring of the mobility pattern data. In an embodiment, the age determination module 204 may apply the ML model 104 on the mobility pattern data to receive the age data as an output. In an example, the age data may include an age group associated with the user 112. In an exemplary scenario, the ML model 104 may provide as the output that the age group of the user 112 is 13 to 16 years. In another example, the age data may include an age of the user 112 based on the mobility pattern data. In an exemplary scenario, the ML model 104 may provide as the output that the age of the user 112 as 15 years based on the mobility pattern data. Along with the age data, the ML model 104 may also output a confidence score associated with the age data of the user 112. The confidence score may indicate a certainty of the age data. In an embodiment, a value of the confidence score may be between 0 and 1. For example, the output of the ML model 104 may be "age data=15 years, and confidence score=0.92". In another example, the output of the ML model 104 may be "age data=10 to 14 years, and confidence score=0.86". Thus, in such a manner, the age data may be determined.

At step 312, a label for user data 108A is determined based on the determined age data. In some embodiments, the label determination module 206 may be configured to determine the label for the user data 108A of the user 112. The user data 108A of the user 112 may be tracked by the platform 114. In an exemplary scenario, the application 116 may be related to the navigational service. The user data 108A may include data tracked by the platform 114 while the user 112 may be using the application 116. Examples of the user data 108A may include, but are not limited to, location data, search history and profile information of the user 112. The determined label includes one of the legal age user or the underage user. In an exemplary scenario, the ML model 104 may output the age data as "age data=15 years, and confidence score=0.92". In such a case, the determined label may be "underage user". In another exemplary scenario, the ML model 104 may output the age data as "age data=23 years, and confidence score=0.91". In such a case, the determined label may be "legal age user".

It may be noted that the legal age of the user may be different for different countries. Also, the legal age required to utilize the application 116 may be different. For example, the application 116 may be an educational application for students of age 15 years and above. In such a case, the minimum legal age to use the application 116 may be 15 years. Thus, in case the determined age data suggests that the user 112 is of 13 years, the determined label may be the "underage user". In another example, the application 116 may be a recommendation application that recommends restaurants and pubs that serve alcohol. In such a case, the minimum legal age to use the application 116 may be 21 years. Thus, in case the determined age data suggests that the user 112 is 33 years, the determined label may be the "legal age user". In case the determined age data suggests that the user 112 is 12 years, the determined label may be the "underage user". In such a manner, the user data 108A of the user 112 may be labelled.

At step 314, the mapping platform 102 may check if the determined label is the "underage user".

At step 316, in case the label is not the underage user, i.e., the label is the legal age user, the labeled user data 108A may be processed. In some embodiments, the user data processing model 208 may be configured to process the labeled user data 108A. The processing may include storing the labeled user data 108A in the database 108 when the determined label corresponds to the legal age user. When the user 112 may be determined to be the legal age user, the user data 108A may be stored with the label "legal age user" for further processing or for utilization for other applications.

In some embodiments, the mapping platform 102 may determine that the age data corresponds to the legal age user, and also the confidence score associated with the age data may be more than or equal to a threshold for a set duration of time. In such a case, the mapping platform 102 may stop the monitoring of the mobility pattern data of the user 112 before the predetermined time period, based on the determination. For example, the predetermined time period may be 10 days. The mapping platform 102 may periodically provide the mobility pattern data to the ML model 104 during the predetermined time period. In an exemplary scenario, at the end of a fourth day of the predetermined time period, the ML model 104 may output that the age of the user 112 is 52 years with the confidence score of 0.95. In an example, the threshold may be 0.90 and the set duration of time may be 2 days. Thus, when the age data of the user 112 corresponds to the legal age user for more than or equal to 2 days and the confidence score remains more than the threshold of 0.9, the monitoring of the mobility pattern data may be stopped. In such a case, further monitoring to identify the legal age user for the remaining of the predetermined time period may be unrequired. In some embodiments, the predetermined time period may be derived from a rule set based on the confidence score. For example, a confidence score within the [0.90-1] range may require a 3 day monitoring period, a confidence score within the [0.80-0.90] range may require a 7 day period, and so on.

At step 318, a consent may be received. In some embodiments, upon determination that the user 112 may be the underage user, the mapping platform 102 may require consent to process the user data 108A of the user 112 tracked via the platform. For example, the mapping platform 102 may provide a pop-up on the application 116 requiring consent to process the user data 108A.

It may be noted that, due to privacy and security concerns, the user data 108A of the underage users may require consent from authorized users associated with the user 112. In an embodiment, the authorized users may be a parent or a guardian of the user 112. For example, the information about the authorized users may be received during the registration process. In another example, a user may be verified as the authorized user by use of information, such as biometric data associated with the authorized user. In such a manner, the user 112 that may be the underage user may be unable to pose as the authorized user to gain improper access to the application 116. In an exemplary scenario, once the pop-up to consent is transmitted to the UE 110, the authorized user may need to, for example, scan a real-time image of the authorized user using the application 116. Such scanning may ensure that the consent is indeed provided by the authorized user. Alternatively, age verified users may be vetted via 3$^{rd}$ party services, such as credit card providers, identity verification services, official entities and the like.

At step 320, in case the label corresponds to the underage user, the labeled user data 108A may be processed based on the consent of the authorized user associated with the user 112 that is the underage user. In some embodiments, the user data 108A processing model 208 may be configured to process the labeled user data 108A. The processing may include performing one or more actions on the labeled user data 108A when the determined label corresponds to the underage user.

In some embodiments, the one or more actions on the labeled user data 108A may include at least one of deleting the labeled user data 108A, encrypting the labeled user data 108A, storing the labeled user data 108A after encryption, storing a set of data from the labeled user data 108A. For example, when the user 112 is identified as the underage user, the user data 108A that may be tracked till date may be encrypted, such as to ensure the privacy of the user 112. The encrypted data may then be stored in the user data database 108 with the label "underage user". In some cases, only the set of data that may be relevant for further processing may be stored in the user data database 108. Moreover, in some cases, the labeled user data 108A may altogether be deleted from the user data database 108. In such a case, the consent from the authorized user may be unrequired. Once the user 112 is identified as the underage user, the user data 108A may be deleted.

At step 322, further tracking of the user data 108A may be stopped. In some embodiments, the mapping platform 102 may be configured to further stop the tracking of the user data 108A via the platform 114, when the determined labeled user data 108A corresponds to the underage user. The tracking of the user data 108A that may include the location data of the user 12 may be stopped to ensure protection of the privacy rights of the user 112 that may be the underage user.

In some embodiments, the mapping platform 102 may be further configured to provide the stored labeled user data 108A for at least one of location-based services, or applications associated with population estimation. For example, the stored labeled user data 108A may be used to improve other services such as the location-based services. In an example, the location-based services may be utilized for traffic information or traffic control on a road. In another example, the applications associated with population estimation may be utilized for population based census of an area.

At step 324, when the user 112 is determined as the underage user, the mapping platform 102 may perform one of limit one or more features of the platform 114 for the user 112, or block usage of the platform 114 for the user 112, until an input corresponding to the consent is received from an authorized user associated with the user 112 of the platform 114. For example, the usage of the application 116 may require parental guidance or advisory. In such cases, until the consent is received from an authorized user associated with the user 112, the usage of the application 116 may be blocked for the user 112. In another example, the one or more features of the application 116 may not be age appropriate for the user 112, or prolonged usage of the one or more features may require parental guidance or advisory. In such cases, the usage of the one or more features may be limited.

Figure 5:
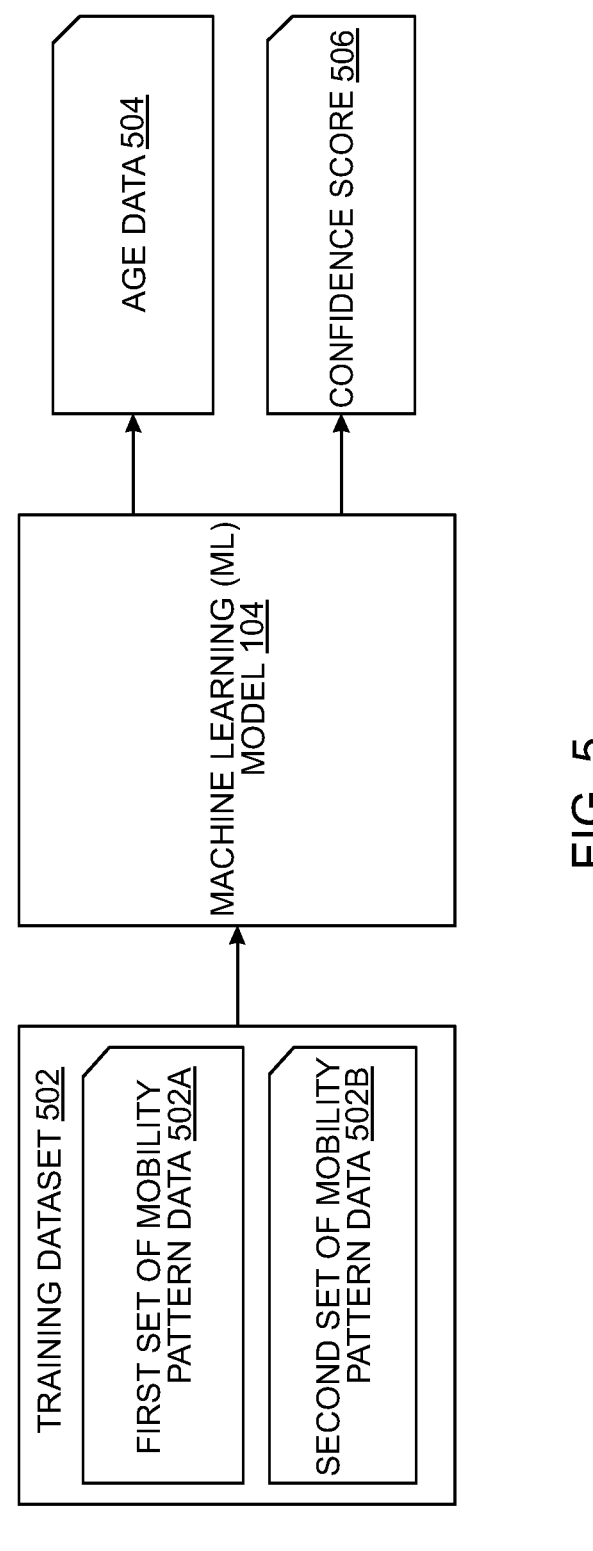
FIG. 5 is a diagram depicting training of a machine learning (ML) model for determining age data of a user, according to one embodiment.

The mapping platform 102 may be further configured to train the ML model 104, further explained in FIG. 5.

FIG. 5 is a diagram 500 depicting training of the ML model 104 for determining age data of the user 112, according to one embodiment. The diagram 500 may include the ML model 104, a ground truth dataset 502, age data 504 and confidence score 506. The ground truth dataset 502 may include a first set of mobility pattern data 502A with a first label and a second set of mobility pattern data 502B with a second label.

In some embodiments, the first set of mobility pattern data 502A may be associated with a set of underage users. The first label may be "underage user". The first set of mobility pattern data 502A may be received based on a consent from a set of users that are authorized to provide the consent. For example, the set of underage users may be users of the platform 114 whose data may have been collected with the consent of the set of users. The set of users may include, for example, the parent or the guardian of each of the set of users. The first set of mobility pattern data 502A may be stored with the first label "underage user" in the user data database 108. The second set of mobility pattern data 502B may be associated with a set of legal age users. The second label may be "legal age user". The second set of mobility pattern data 502B may be received based on the consent of the set of legal age users. For example, the set of legal age users may be users of the platform 114 whose data may have been collected with their consent. The second set of mobility pattern data 502B may be stored with the second label "legal age user" in the user data database 108. In such a manner, the ground truth dataset 502 may be generated. The ground truth dataset 502 may include data such as the location data, timestamp associated with the location data, the frequency of visits to different locations by the set of underage users and the set of legal age users, and so forth. In some embodiments, additional labels may be utilized for different age ranges, e.g. 0-12, 12-17, 18-25, 26-65, 66 and above, covering children, teenagers, young adults, adults, senior citizens, etc. Further adjustments to the consent management may be made based on the additional labels.

In some embodiments, the mapping platform 102 may be configured to train the ML model 104 to determine the age data 504. The ML model 104 may be, for example, a prediction model that is trained to predict the age of the user or the age group of the user whose mobility pattern data is provided as the input. The mapping platform 102 may provide, as a training input, the ground truth dataset 502 to the ML model 104. The mapping platform 102 may further receive, as a training output, the age data 504 of each user of the set of underage users and the set of legal age users. The ML model 104 may be trained until an error rate associated with the training output is less than a threshold. For example, the training output may be compared with the corresponding first label or the second label. In an exemplary scenario, one of the first set of mobility pattern data may be provided to the ML model 104 whose first label is the underage user. In an example, the ML model 104 provides the training output as the underage user. The mapping platform 102 may compare the first label "underage user" with the training output, i.e., the underage user. In case the first label and the training output are same, the mapping platform 102 may determine that there is no error. In another example, the ML model 104 provides the training output as the legal age user. In such a case, the first label and the training output are different, thus, the mapping platform 102 may determine that there is error. Similarly, for each training input, the error may be determined. The error rate may be determined based on a number of errors determined for the training input. When the error rate is less than a threshold, the training me be considered complete.

FIG. 6 is a flowchart of a method 600 for age based processing of the user data 108A, according to one embodiment. In various embodiments, the mapping platform 102 and/or any of the modules 202-208 may perform one or more portions of the method 600 and may be implemented in, for instance, a chip set including a processor and a memory as shown in FIG. 8 and FIG. 9. As such, the mapping platform 102 and/or any of the modules 202-208 may provide means for accomplishing various parts of the method 600, as well as means for accomplishing embodiments of other processes described herein in conjunction with other components of the system 100. Although the method 600 is illustrated and described as a sequence of steps, it is contemplated that various embodiments of the method 600 may be performed in any order or combination and need not include all of the illustrated steps.

At step 602, the mobility pattern data may be monitored. In some embodiments, the mobility pattern monitoring module 202 may be configured to monitor the mobility pattern data of the user 112 for the predetermined time period. The monitoring of the mobility pattern data of the user 112 for the predetermined time period may be consented by the user 112 registered on the platform 114. Details of monitoring the mobility pattern data are further provided, for example, at step 306 in FIG. 3 and FIG. 4.

At step 604, the age data of the user 112 may be determined. In some embodiments, the age determination module 204 may be configured to determine the age data of the user 112 based on the monitoring of the mobility pattern data. In an example, the age data may include the age of the user 112 or the age group of the user 112. In some embodiments, the ML model 104 may be utilized to determine the age data of the user 112 based on the mobility pattern data. Details of determination of the age data are further provided, for example, at step 310 in FIG. 3.

At step 606, the label may be determined for the user data 108A. In some embodiments, the label determination module 206 may be configured to determine the label for the user data 108A associated with the user 112. The label may be determined based on the age data of the user 112. The label may include one of the legal age user or the underage user. Details of determination of the label are further provided, for example, at step 312 in FIG. 3.

At step 608, the labeled user data 108A may be processed. In some embodiments, the user data processing module 208 may be configured to process the labeled user data 108A. The processing may include storing the labeled user data 108A in the user data database 108 when the determined label corresponds to the legal age user. The processing may include performing one or more actions on the labeled user data 108A when the determined label corresponds to the underage user. In such a manner, the user data 108A of the underage users may be protected, and the privacy rights of the underage users may be maintained. Details of processing the user data 108A are further provided, for example, at steps 316 and 320 in FIG. 3.

Returning to FIG. 1, as shown, the system 100 includes the mapping platform 102 for processing the user data 108A based on the age data. The services platform 118 may include one or more services, such as the service 118A and the service 118N. The content providers 120 may further include one or more content providers, such as the content provider 120A and the content provider 120M.

In one embodiment, the mapping platform 102 has connectivity over the communication network 122 to the services platform 118 that provides the one or more services, such as the service 118A and the service 118N that can use the user data 108A for downstream functions. By way of example, the service 118A and the service 118N may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the service 118A and the service 118N uses the output of the mapping platform 102 (e.g., the user data 108A, maps stored in the geographic database 108, etc.) to provide services such as navigation, mapping, other location-based services, etc. to the UE 110, the application 116, and/or other client devices. In one embodiment, the service platform 118 may act as a content provider, analogously to content provider 120A, providing the user data 108A to the mapping platform 102, either directly or via the user data database 108. In some embodiments, the user data database 108 may also be one of the content providers 120 or the services platform 118.

In one embodiment, the mapping platform 102 may be a platform with multiple interconnected components. The mapping platform 102 may include multiple servers, intelligent networking devices, computing devices, components, and corresponding software for processing of the user data 108A according to the various embodiments described herein. In addition, it is noted that the mapping platform 102 may be a separate entity of the system 100, a part of the service 118A and the service 118N, a part of the services platform 118, or included within components of the UE 110.

In one embodiment, the content providers 120 may provide content or data (e.g., the user data 108A, probe data, related geographic data, etc.) to the geographic database 106, the mapping platform 102, the services platform 118, the service 118A and the service 118N, the UE 110, and/or the application 116 executing on the UE 110. The content provided may be any type of content, such as user data 108A, other contextual data (such as weather data, calendar data, event data, transport schedules), sensor data, imagery, probe data, machine learning models, permutations matrices, map embeddings, map content, textual content, video content, image content, etc., for example, obtained via the UE 110. In one embodiment, the content providers 120 may provide content that may aid in processing of the user data 108A, the other contextual data, etc. according to the various embodiments described herein. In one embodiment, the content providers 120 may also store content associated with the geographic database 106, the mapping platform 102, the services platform 118, the service 118A and the service 118N, and/or any other component of the system 100. In another embodiment, the content providers 120 may manage access to a central repository of data, and offer a consistent, standard interface to data, such as a repository of the geographic database 106.

In one embodiment, the UE 110 may execute software applications to use the user data 108A or other data derived therefrom according to the embodiments described herein. By way of example, the applications 116 may also be any type of application that is executable on the UE 110, such as autonomous driving applications, routing applications, mapping applications, location-based service applications, navigation applications, device control applications, content provisioning services, camera/imaging application, media player applications, social networking applications, calendar applications, and the like. In one embodiment, the application 116 may function as a client for the mapping platform 102 and perform one or more functions associated with processing of the user data 108A alone or in combination with the mapping platform 102.

By way of example, the UE 110 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 110 can support any type of interface to the user (such as "wearable" circuitry, etc.). In one embodiment, the UE 110 may be associated with or be a component of a vehicle or any other device.

In one embodiment, the UE 110 is configured with various sensors for collection of the user data 108A that may include location data, such as related geographic data, etc. In one embodiment, the location data included in the user data 108A represent data associated with a geographic location or coordinates at which sensor data was collected, and the polyline or polygonal representations of detected objects of interest derived therefrom to generate the digital map data of the geographic database 106. In an example, the location data may be utilized to generate the mobility pattern data. By way of example, the sensors may include a global positioning sensor for gathering location data (e.g., GPS, GALILEO, BEIDOU, GLONASS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, magnetometer, switch sensors for determining whether one or more vehicle switches are engaged, and the like. Furthermore, data in the geographic database 106 and other context data sources such as weather data, calendar, transport schedules, event data and the like may also be utilized to generate the mobility pattern data. Thus, the mobility pattern data may be assembled by using the UE 110, the graphic database 106 and the other context data sources.

Other examples of sensors of the UE 110 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the UE 110 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 110 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 122 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 102, the services platform 118, the service 118A and the service 118N, the UE 110, and/or the content providers 120 communicate with each other and other components of the system 100 using well known, new or still developing protocols. In this context, a protocol includes a set of rules defining how the network nodes within the communication network 122 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

FIG. 7 is a diagram of the geographic database 106, according to one embodiment. In one embodiment, the geographic database 106 includes geographic data 702 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 702. In one embodiment, the geographic database 106 includes high definition (HD) mapping data that provide centimeter-level or better accuracy of map features. For example, the geographic database 106 can be based on Light Detection and Ranging (LiDAR) or equivalent technology to collect billions of 3D points and model road surfaces and other map features down to the number lanes and their widths. In one embodiment, the HD mapping data (e.g., HD data records 712) and/or other mapping data of the geographic database 106 capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 106.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 106 follows certain conventions. For example, links do not cross themselves and do not cross each other except at a node. Also, there are no duplicated shape points, nodes, or links. Two links that connect each other have a common node. In the geographic database 106, overlapping geographic features are represented by overlapping polygons. When polygons overlap, the boundary of one polygon crosses the boundary of the other polygon. In the geographic database 108, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 106 includes node data records 704, road segment or link data records 706, POI data records 708, user data records 710, HD mapping data records 1012, and indexes 714, for example. In some examples, the user data 108A may be stored as the node data records 704, the road segment or the link data records 706, the POI data records 708, the user data records 710, the HD mapping data records 712, and the indexes 714. More, fewer, or different data records can be provided. In some embodiments, the user data records 710 may be stored in the geographic database 106 or the user data database 108. In one embodiment, additional data records (not shown) can include cartographic ("carto") data records, routing data, and maneuver data. In one embodiment, the indexes 714 may improve the speed of data retrieval operations in the geographic database 106. In one embodiment, the indexes 714 may be used to quickly locate data without having to search every row in the geographic database 106 every time it is accessed. For example, in one embodiment, the indexes 714 can be a spatial index of the polygon points associated with stored feature polygons. In one or more embodiments, data of a data record may be attributes of another data record.

In exemplary embodiments, the road segment data records 706 are links or segments representing roads, streets, paths, or bicycle lanes, as can be used in the calculated route or recorded route information for determination of speed profile data. The node data records 704 are end points (for example, representing intersections or an end of a road) corresponding to the respective links or segments of the road segment data records 706. The road segment data records 706 and the node data records 704 represent a road network, such as used by vehicles, cars, and/or other entities. Alternatively, the geographic database 106 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 106 can include data about the POIs and their respective locations in the POI data records 708. The geographic database 106 can also include data about road attributes (e.g., traffic lights, stop signs, yield signs, roundabouts, lane count, road width, lane width, etc.), places, such as cities, towns, or other communities, and other geographic features, such as bodies of water, mountain ranges, etc. Such place or map feature data can be part of the POI data records 708 or can be associated with POIs or POI data records 708 (such as a data point used for displaying or representing a position of a city). The POI data records 708 may also mention the POIs that require age verification. Such POIs may require users to provide an ID proof to access the location. These POIs may prove to be a better indicator of the mobility pattern data being of the legal age user.

In one embodiment, the geographic database 106 can also include the user data records 710 for storing the user data 108A, and/or any other related data that is used or generated according to the embodiments described herein. By way of example, the user data records 710 can be associated with one or more of the node records 704, the road segment records 706, and/or the POI data records 708 to associate the speed profile data records with specific places, POIs, geographic areas, and/or other map features. In this way, the linearized data records can also be associated with the characteristics or metadata of the corresponding records 704, 706, and/or 708.

In one embodiment, as discussed above, the HD mapping data records 712 model road surfaces and other map features to centimeter-level or better accuracy. The HD mapping data records 712 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 712 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 712 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 712.

In one embodiment, the HD mapping data records 712 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 106 can be maintained by the content provider 120 in association with the mapping platform 102 (e.g., a map developer or service provider). The map developer can collect geographic data to generate and enhance the geographic database 106. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 106 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicle and/or the UE 110. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for processing the user data 108A may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 is a diagram of hardware that can be used to implement an embodiment. Computer system 800 is programmed (e.g., via computer program code or instructions) for processing the user data 108A as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

The bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to processing of the user data 108A. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

The computer system 800 also includes a memory 804 coupled to bus 810. The memory 804, such as a random access memory (RAM) or other dynamic storage device, stores information including processor instructions for processing the user data 108A. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, which is not changed by the computer system 800. Some memory is composed of volatile storage that loses the information stored thereon when power is lost. Also coupled to the bus 810 is a non-volatile (persistent) storage device 808, such as a magnetic disk, optical disk, or flash card, for storing information, including instructions, which persists even when the computer system 800 is turned off or otherwise loses power.

Information, including instructions for processing the user data 108A, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 818, is coupled to the bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 800 also includes one or more instances of a communications interface 820 coupled to bus 810. The communication interface 820 provides a one-way or two-way communication coupling to a variety of external devices that operate with their own processors, such as printers, scanners, and external disks. In general, the coupling is with a network link 822 that is connected to a local network 824 to which a variety of external devices with their own processors are connected. For example, the communication interface 820 may be a parallel port or a serial port or a universal serial bus (USB) port on a personal computer. In some embodiments, communications interface 820 is an integrated services digital network (ISDN) card or a digital subscriber line (DSL) card or a telephone modem that provides an information communication connection to a corresponding type of telephone line. In some embodiments, the communication interface 820 is a cable modem that converts signals on the bus 810 into signals for a communication connection over a coaxial cable or into optical signals for a communication connection over a fiber optic cable. As another example, communications interface 820 may be a local area network (LAN) card to provide a data communication connection to a compatible LAN, such as Ethernet. Wireless links may also be implemented. For wireless links, the communications interface 820 sends or receives or both sends and receives electrical, acoustic, or electromagnetic signals, including infrared and optical signals, which carry information streams, such as digital data. For example, in wireless handheld devices, such as mobile telephones like cell phones, the communications interface 820 includes a radio band electromagnetic transmitter and receiver called a radio transceiver. In certain embodiments, the communications interface 820 enables connection to the communication network 122 for processing the user data 108A.

The term computer-readable medium is used herein to refer to any medium that participates in providing information to processor 802, including instructions for execution. Such a medium may take many forms, including, but not limited to, non-volatile media, volatile media, and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 822 typically provides information communication using transmission media through one or more networks to other devices that use or process the information. For example, the network link 822 may provide a connection through local network 824 to a host computer 826 or to equipment 828 operated by an Internet Service Provider (ISP). ISP equipment 828 in turn provides data communication services through the public, world-wide packet-switching communication network of networks now commonly referred to as the Internet 830.

A computer called a server host 832 connected to the Internet hosts a process that provides a service in response to information received over the Internet. For example, server host 832 hosts a process that provides information representing video data for presentation at display 814. It is contemplated that the components of system can be deployed in various configurations within other computer systems, e.g., host 826 and server 832.

FIG. 9 is a diagram of a chip set 900 that can be used to implement an embodiment. The chip set 900 is programmed to process the user data 108A as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 902 for passing information among the components of the chip set 900. A processor 904 has connectivity to the bus 902 to execute instructions and process information stored in, for example, a memory 906. The processor 904 may include one or more processing cores with each core configured to perform independently. A multi-core processor enables multiprocessing within a single physical package. Examples of a multi-core processor include two, four, eight, or greater numbers of processing cores. Alternatively, or in addition, the processor 904 may include one or more microprocessors configured in tandem via the bus 902 to enable independent execution of instructions, pipelining, and multithreading. The processor 904 may also be accompanied with one or more specialized components to perform certain processing functions and tasks such as one or more digital signal processors (DSP) 908, or one or more application-specific integrated circuits (ASIC) 910. A DSP 908 typically is configured to process real-world signals (e.g., sound) in real time independently of the processor 904. Similarly, an ASIC 910 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 904 and accompanying components have connectivity to the memory 906 via the bus 902. The memory 906 includes both dynamic memory (e.g., RAM, magnetic disk, writable optical disk, etc.) and static memory (e.g., ROM, CD-ROM, etc.) for storing executable instructions that when executed perform the inventive steps described herein to process the user data 108A. The memory 906 also stores the data associated with or generated by the execution of the inventive steps.

Figure 10:
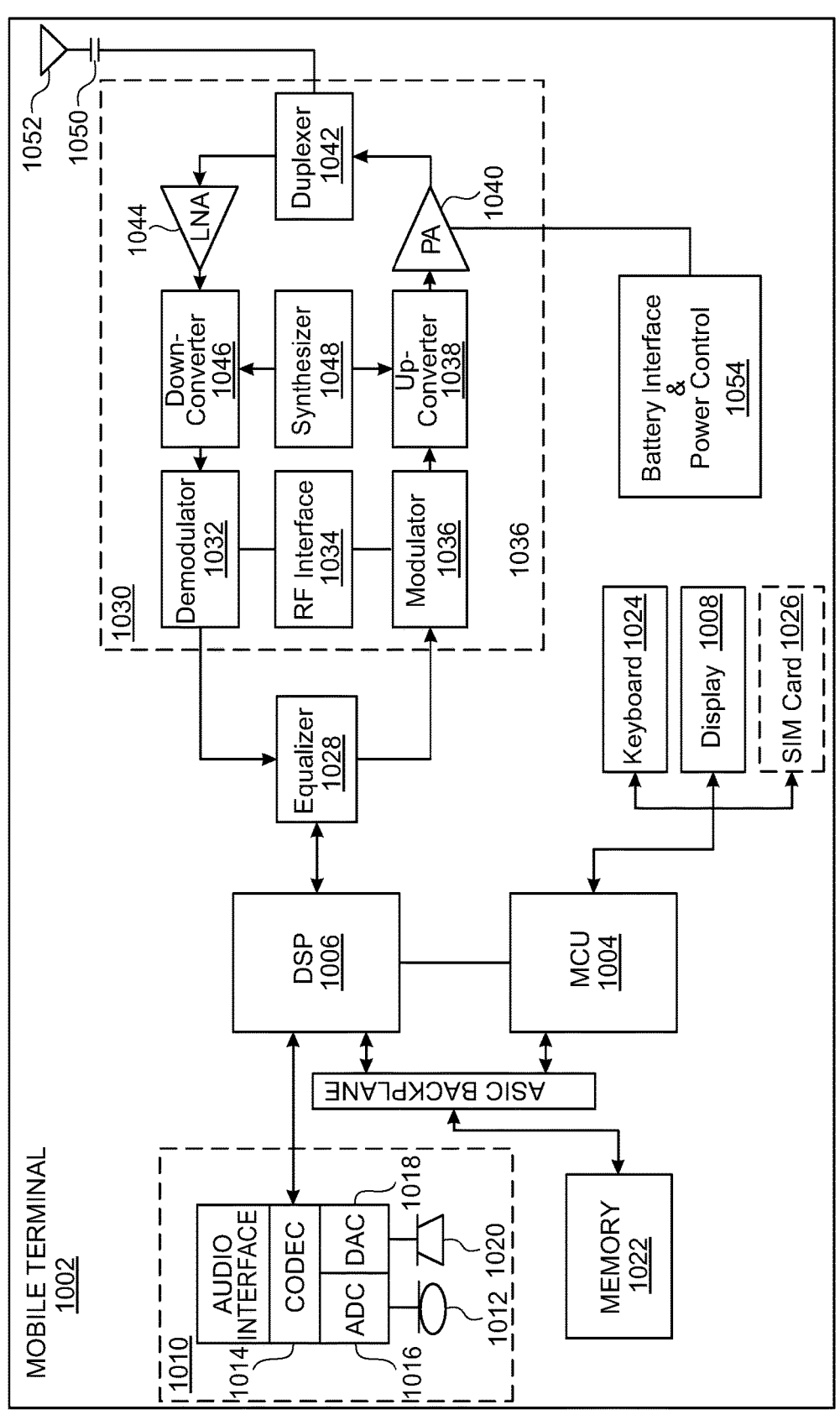
FIG. 10 is a diagram of a mobile terminal (e.g., handset, vehicle, or part thereof) that can be used to implement an embodiment.

FIG. 10 is a diagram of a mobile terminal 1002 (e.g., handset, vehicle, or part thereof) that can be used to implement an embodiment. Generally, a radio receiver is often defined in terms of front-end and back-end characteristics.

The front end of the receiver encompasses all of the Radio Frequency (RF) circuitry whereas the back end encompasses all of the base-band processing circuitry. Pertinent internal components of the telephone include a Main Control Unit (MCU) 1004, a Digital Signal Processor (DSP) 1006, and a receiver/transmitter unit including a microphone gain control unit and a speaker gain control unit. A main display unit 1008 provides a display to the user in support of various applications and mobile station functions that offer automatic contact matching. An audio function circuitry 1010 includes a microphone 1012 and microphone amplifier that amplifies the speech signal output from the microphone 1012. The amplified speech signal output from the microphone 1012 is fed to a coder/decoder (CODEC) 1014.

A radio section 1030 amplifies power and converts frequency in order to communicate with a base station, which is included in a mobile communication system, via antenna 1052. The power amplifier (PA) 1040 and the transmitter/modulation circuitry are operationally responsive to the MCU 1004, with an output from the PA 1040 coupled to the duplexer 1042 or circulator or antenna switch, as known in the art. The PA 1040 also couples to a battery interface and power control unit 054.

In use, a user of mobile station 1002 speaks into the microphone 1012 and his or her voice along with any detected background noise is converted into an analog voltage. The analog voltage is then converted into a digital signal through the Analog to Digital Converter (ADC) 1016. The control unit 1004 routes the digital signal into the DSP 1006 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (Wi-Fi), satellite, and the like.

The encoded signals are then routed to an equalizer 1028 for compensation of any frequency-dependent impairments that occur during transmission though the air such as phase and amplitude distortion. After equalizing the bit stream, the modulator 1036 combines the signal with an RF signal generated in the RF interface 1034. The modulator 1036 generates a sine wave by way of frequency or phase modulation. In order to prepare the signal for transmission, an up-converter 1038 combines the sine wave output from the modulator 1036 with another sine wave generated by a synthesizer 1048 to achieve the desired frequency of transmission. The signal is then sent through a PA 1040 to increase the signal to an appropriate power level. In practical systems, the PA 1040 acts as a variable gain amplifier whose gain is controlled by the DSP 1006 from information received from a network base station. The signal is then filtered within the duplexer 1042 and optionally sent to an antenna coupler 1050 to match impedances to provide maximum power transfer. Finally, the signal is transmitted via antenna 1052 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1002 are received via antenna 1052 and immediately amplified by a low noise amplifier (LNA) 1044. A down-converter 1046 lowers the carrier frequency while the demodulator 1032 strips away the RF leaving only a digital bit stream. The signal then goes through the equalizer 1028 and is processed by the DSP 1006. A Digital to Analog Converter (DAC) 1018 converts the signal and the resulting output is transmitted to the user through the speaker 1020, all under control of a Main Control Unit (MCU) 1004 which can be implemented as a Central Processing Unit (CPU) (not shown).

The MCU 1004 receives various signals including input signals from the keyboard 1024. The keyboard 1024 and/or the MCU 1004 in combination with other user input components (e.g., the microphone 1012) comprise a user interface circuitry for managing user input. The MCU 1004 runs a user interface software to facilitate user control of at least some functions of the mobile station 1002 for processing the user data 108A. The MCU 1004 also delivers a display command and a switch command to the display 1008 and to the speech output switch controller, respectively. Further, the MCU 1004 exchanges information with the DSP 1006 and can access an optionally incorporated SIM card 1026 and a memory 1022. In addition, the MCU 1004 executes various control functions required of the station. The DSP 1006 may, depending upon the implementation, perform any of a variety of conventional digital processing functions on the voice signals. Additionally, DSP 1006 determines the background noise level of the local environment from the signals detected by microphone 1012 and sets the gain of microphone 1012 to a level selected to compensate for the natural tendency of the user of the mobile station 1002.

The CODEC 1014 includes the ADC 1016 and DAC 1018. The memory 1022 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1022 may be, but not limited to, a single memory, CD, DVD, ROM, RAM, EEPROM, optical storage, or any other non-volatile or non-transitory storage medium capable of storing digital data.

An optionally incorporated SIM card 1026 carries, for instance, important information, such as the cellular phone number, the carrier supplying service, subscription details, and security information. The SIM card 1026 serves primarily to identify the mobile station 1002 on a radio network. The card 1026 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system for age based processing of user data, the system comprising:
   at least one processor; and
   at least one memory including computer program code for one or more programs, the at least one memory and the computer program code configured to, with the at least one processor, cause the system to perform at least the following:

monitor mobility pattern data of a user for a predetermined time period, wherein the mobility pattern data comprise one or more locations visited by the user, and wherein the monitoring of the mobility pattern data of the user for the predetermined time period is consented by the user registered on a platform;

determine age data of the user based on the monitoring of the mobility pattern data;

determine a label for the user data associated with the user based on the determined age data of the user, wherein the determined label comprises one of: a first age user label or a second age user label; and process the labeled user data, wherein the processing comprises:

storing the labeled user data in a user data database when the determined label corresponds to the first age user label; and performing one or more actions on the labeled user data when the determined label corresponds to the second age user label.

2. The system of claim 1, wherein the monitored mobility pattern data for the predetermined time period comprises information associated with at least one of: visited points of interests (POIs) by the user, frequency of the visits to the POIs, a timestamp associated with the POIs, a duration of the visits to the POIs, a type of transportation utilized by the user to access the POIs, a frequency of the utilization of the type of transportation, weather conditions at a time of the visits, a type of events associated with the POIs, and a set of users attending the events at the POIs.

3. The system of claim 1, wherein the system is further caused to:

provide, as an input, the monitored mobility pattern data of the user to a machine learning (ML) model; and receive, as an output, the determined age data of the user, and a confidence score associated with the output.

4. The system of claim 3, wherein the system is further caused to:

determine: i) that the age data corresponds to the first age user label, and ii) the confidence score associated with the output is more than or equal to a threshold for a set duration of time; and stop the monitoring of the mobility pattern data of the user before the predetermined time period, based on the determination.

5. The system of claim 3, wherein the system is further caused to generate a ground truth dataset to train the ML model for the determination of the age data of the user, and wherein the ground truth dataset comprises:

a first set of mobility pattern data with a first label associated with a set of users of a first age range, wherein the first set of mobility pattern data is received based on a consent from a set of users that are authorized to provide the consent; and a second set of mobility pattern data with a second label associated with a set of users of a second age range, wherein the second set of mobility pattern data is received based on the consent of the set of legal age users of the second age range.

6. The system of claim 1, wherein the system is further caused to stop tracking of the user data via the platform, when the determined labeled user data corresponds to the user of a first age range.

7. The system of claim 1, wherein the system is further caused to provide the stored labeled user data for at least one of: location-based services, or applications associated with population estimation.

8. The system of claim 1, wherein the performing of the one or more actions on the labeled user data comprises at least one of: deleting the labeled user data, encrypting the labeled user data, storing the labeled user data after encryption, storing a set of data from the labeled user data, and wherein the encryption and storing are based on the consent of an authorized user associated with the user of the platform.

9. The system of claim 1, wherein based on the determined label that corresponds to the user of a first age range, the system is further caused to perform one of: limit one or more features of the platform for the user, or block usage of the platform for the user, until an input corresponding to the consent is received from an authorized user associated with the user of the platform.

10. A method for age based processing of user data, comprising:

monitoring mobility pattern data of a user for a predetermined time period, wherein the mobility pattern data comprise one or more locations visited by the user, and wherein the monitoring of the mobility pattern data of the user for the predetermined time period is consented by the user registered on a platform;

determining age data of the user based on the monitored mobility pattern data;

determining a label for the user data associated with the user based on the determined age data of the user, wherein the determined label comprises one of: a first age user label or a second age user label; and processing the labeled user data, wherein the processing comprises:

storing the labeled user data in a user data database when the determined label corresponds to the first age user label; and performing one or more actions on the labeled user data when the determined label corresponds to the second age user label.

11. The method of claim 10, further comprising:

providing, as an input, the monitored mobility pattern data of the user to a machine learning (ML) model; and receiving, as an output, the determined age data of the user, and a confidence score associated with the output.

12. The method of claim 10, further comprising:

determining: i) that the age data corresponds to the first age user label, and ii) the confidence score associated with the output is more than or equal to a threshold for a set duration of time; and stopping the monitoring of the mobility pattern data of the user before the predetermined time period, based on the determination.

13. The method of claim 11, further comprising generating a ground truth dataset for training the ML model for the determination of the age data of the user, and wherein the ground truth dataset comprises:

a first set of mobility pattern data with a first label associated with a set of users of a first age range, wherein the first set of mobility pattern data is received based on a consent from a set of users that are authorized to provide the consent; and a second set of mobility pattern data with a second label associated with a set of users of a second age range, wherein the second set of mobility pattern data is received based on the consent of the set of users of the second age range.

14. The method of claim 10, further comprising stopping tracking of the user data via the platform, when the provided labeled user data corresponds to the user of a first age range.

15. The method of claim 10, further comprising providing the stored labeled user data for at least one of: location-based services, or applications associated with population estimation.

16. The method of claim 10, wherein the performing of the one or more actions on the labeled user data comprises at least one of: deleting the labeled user data, encrypting the labeled user data, storing the labeled user data after encryption, storing a set of data from the labeled user data, and wherein the encryption and storing are based on the consent of an authorized user associated with the user of the platform.

17. The method of claim 10, wherein based on the provided label that corresponds to the user of a first age range, the method further comprises performing one of: limiting one or more features of the platform for the user, or blocking usage of the platform for the user, until an input corresponding to the consent is received from an authorized user associated with the user of the platform.

18. A non-transitory computer-readable storage medium carrying one or more sequences of one or more instructions which, when executed by one or more processors, cause an apparatus to perform operations comprising:

monitoring mobility pattern data of a user for a predetermined time period, wherein the mobility pattern data comprise one or more locations visited by the user, and wherein the monitoring of the mobility pattern data of the user for the predetermined time period is consented by the user registered on a platform;

determining age data of the user based on the monitored mobility pattern data;

determining a label for the user data associated with the user based on the determined age data of the user, wherein the determined label comprises one of: a first age user label or a second age user label; and processing the labeled user data, wherein the processing comprises:

storing the labeled user data in a user data database when the determined label corresponds to the first age user label; and performing one or more actions on the labeled user data when the determined label corresponds to the second age user label.

19. The non-transitory computer readable storage medium of claim 18, the operations further comprising:

providing, as an input, the monitored mobility pattern data of the user to a machine learning (ML) model; and receiving, as an output, the determined age data of the user, and a confidence score associated with the output.

20. The non-transitory computer readable storage medium of claim 18, wherein the performing of the one or more actions on the labeled user data comprises at least one of: deleting the labeled user data, encrypting the labeled user data, storing the labeled user data after encryption, storing a set of data from the labeled user data, and wherein the encryption and storing are based on the consent of an authorized user associated with the user of the platform.

\* \* \* \* \*